No. 630,131. Patented Aug. 1, 1899.
J. P. TARR.
HOG TRAP.
(Application filed May 16, 1899.)
(No Model.) 2 Sheets—Sheet 2.
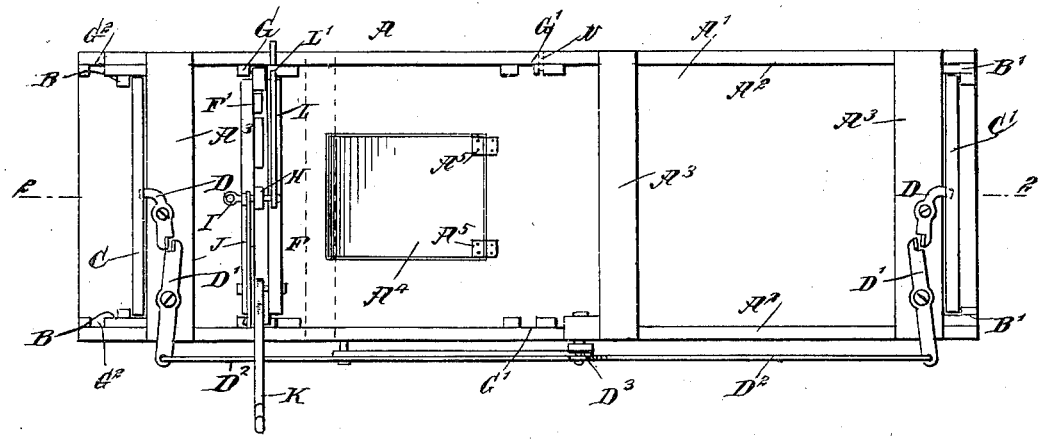
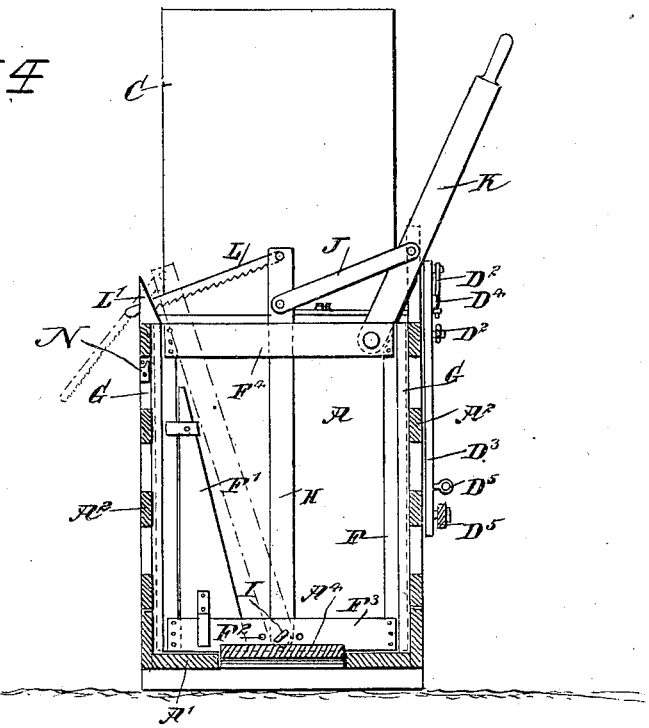
WITNESSES: H. Walker
INVENTOR J. P. Tarr

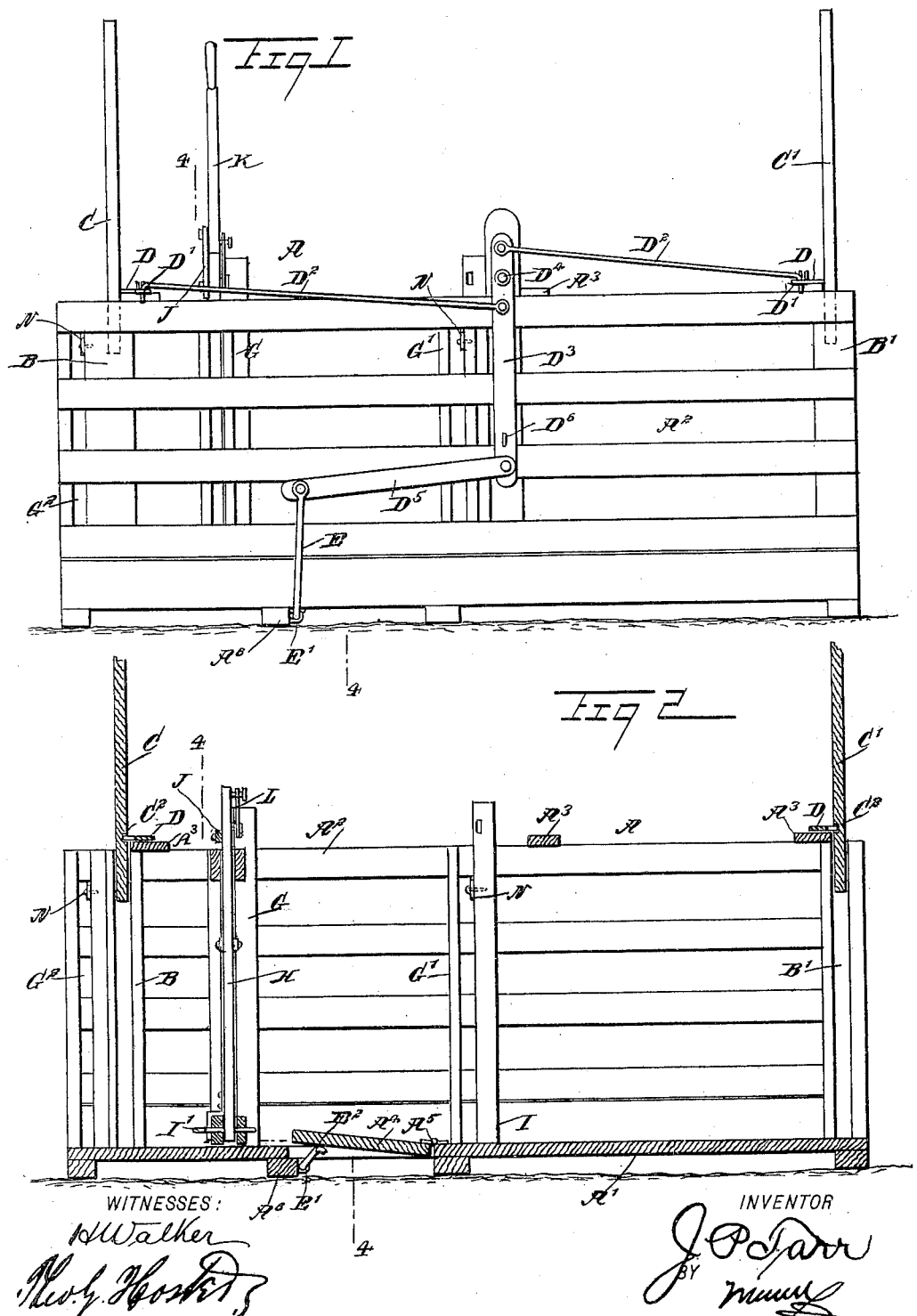

UNITED STATES PATENT OFFICE.

JOHN PINCKNEY TARR, OF AUGUSTA, ILLINOIS.

HOG-TRAP.

SPECIFICATION forming part of Letters Patent No. 630,131, dated August 1, 1899.

Application filed May 16, 1899. Serial No. 716,983. (No model.)

*To all whom it may concern:*

Be it known that I, JOHN PINCKNEY TARR, of Augusta, in the county of Hancock and State of Illinois, have invented a new and Improved Hog-Trap, of which the following is a full, clear, and exact description.

The object of the invention is to provide a new and improved hog-trap which is simple and durable in construction, arranged to cause an animal to readily enter the trap and to then automatically close it, and to allow the operator to conveniently hold the animal for ringing, marking, or for other purposes.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1 is a side elevation of the improvement. Fig. 2 is a sectional side elevation of the same on the line 2 2 in Fig. 3. Fig. 3 is a plan view of the same, and Fig. 4 is a transverse section of the same on the line 4 4 in Fig. 1.

The improved hog-trap is provided with a crate or cage A, provided with a solid bottom A' and skeleton sides $A^2$, connected with each other at the top by cross-pieces $A^3$, as plainly indicated in the drawings. On the ends of the crate or cage A are arranged vertically-disposed guideways B B' for drop-doors C C', respectively, to slide in, said drop-doors being locked in an open position, as illustrated in the drawings, by suitable locking devices, both simultaneously controlled from a trap-door $A^4$, forming part of the bottom A', as illustrated in the drawings, special reference being had to Figs. 2, 3, and 4.

Each of the locking devices for a drop-door C or C' is provided with a locking-catch D in the form of a lever, pivoted on one of the cross-bars $A^3$ and adapted to engage with its free end a recess $C^2$, formed on the inner face of the door near the bottom thereof. The other end of the lever-catch D is adapted to be engaged by one end of a second lever D', likewise fulcrumed on the cross-piece $A^3$ and pivotally connected by a link $D^2$ with an upright lever $D^3$, fulcrumed at $D^4$ on one side A' of the crate or cage. The lower end of the lever $D^3$ (see Fig. 1) is pivotally connected by a link $D^5$ with an arm E, extending upwardly from a shaft E', journaled in suitable bearings attached to a bottom cross-piece $A^6$, as is plainly shown in Figs. 1 and 2.

The shaft E' is provided with an upwardly-extending arm $E^2$, adapted to engage the under side of the trap-door $A^4$ near the free end thereof, so as to hold said door in an inclined uppermost position for the animal to step on said door and swing said door downward by its weight, to cause a swinging of the arm $E^2$, the shaft E', and the other arm E, and to impart a swinging motion to the lever $D^3$, which in turn, by the links $D^2$, imparts a swinging motion to the levers E', and the latter impart a swinging motion to the lever-catches D, so that said catches are disengaged from the drop-doors C C' to allow the latter to slide downward by their own weight in the guideways B B' and close the ends of the cage or crate.

The door $A^4$ when in a lowermost position rests with its free end on a projecting portion of the cross-beam $A^6$, said door then being flush with the rest of the bottom A'. The door $A^4$ is connected by hinges $A^5$ with the bottom A', and in front of the free end of the door $A^4$ are formed vertically-disposed guideways G for receiving a frame F, forming part of the holder for the animal's neck, said frame being also adapted to be inserted into a second set of guideways G', secured on the sides $A^2$ somewhat in the rear of the door $A^4$ whenever the holder is to be used for short or small hogs, and the frame is also adapted to be set in a set of guideways $G^2$ at the forward end of the cage A in front of the guideways B whenever it is desired to operate on the animal from the outside of the cage.

The holder is provided, besides the frame F, with a bar F', having its inner edge beveled, as is plainly shown in Fig. 4, and which bar operates in conjunction with a lever H for engaging and clamping the neck of the animal. The lever H is fulcrumed at its lower end on a pin I, held in one of a series of apertures $F^2$, extending longitudinally in the bottom bar $F^3$ of the frame F, the pin I being adjustable in the apertures, according to the size of the neck of the animal, to move the fulcrum end of the lever H nearer to or farther from the base of the bar F'. The upper end of the lever H is guided in the top F⁴ of the frame F, and said lever is pivotally connected near its upper end by a link J with an operating-lever K under the control of the operator and fulcrumed on said top F⁴ near the side of the frame. On the extreme upper end of the lever H is fulcrumed a notched bar L, adapted to engage a locking head or pin L', attached to or formed on one of the guideways G or on one of the sides A² of the cage or crate to hold the lever H in the desired locked position after said lever is pushed in contact with the animal's neck by the operator manipulating the lever K correspondingly.

On each of the guideways G, G', and G² is arranged a latch N for supporting the frame F temporarily in an uppermost position—that is, at the time the drop-doors C C' are in raised position for the animal to pass into the cage from the right-hand end—it being understood that as both drop-doors as well as the holder are raised a free and unobstructed passage is formed for the animal to readily enter the cage. Now when the animal passes into the crate and steps upon the trap-door A⁴, then both doors C C' are unlocked and slide by their own weight into a lowermost position to close the ends of the cage, so that the animal is trapped between the doors C C', and the holder is then lowered by releasing the latch N and the animal's head is now caught between the lever H and the bar F'. The operator now moves the lever K transversely to swing the lever H over toward the bar F' and clamp the neck of the animal in position between the bar and the lever to allow the operator to conveniently ring, mark, or otherwise treat the animal for the desired purpose. When this has been done, the lever K is swung back to its former position and the doors C C' and the holder are raised and again locked in place manually by the operator swinging the catches D in engagement with the recesses C² and the latch N under the frame F. The animal can now pass under the raised door C to the outside of the cage.

The link D⁵ may be disconnected from the lever D³ and a rope attached to an eye D⁶ on the said lever D³ to permit the operator to release the drop-doors C C' whenever he pulls the said rope. This arrangement is serviceable when it is desired to trap a particular animal in a herd driven through the cage one after the other, the operator pulling the rope when the desired animal is in the trap to cause the doors C C' to drop and close the cage with the desired animal trapped therein.

Having thus fully described my invention, I claim as new and desire to secure by Letters Patent—

1. A hog-trap, provided with a cage, self-closing doors for the ends of the cage, a locking mechanism for holding the doors in a raised, open position, a trap-door in and forming part of the bottom of the cage, a connection between said locking mechanism and said trap-door, for unlocking the self-closing doors and allowing the same to slide into a closed position by their own weight, said connection comprising lever-catches for engaging recesses in said doors, levers for imparting a swinging motion to said lever-catches, links connecting said levers with a third lever, and a shaft having two arms, one of which engages said door at the under side thereof and the other arm is connected by a link with said third lever, substantially as shown and described.

2. A hog-trap, provided with a cage having self-closing doors at its ends, a trap-door in and forming part of the bottom of said cage and adapted to release said end doors, to allow the latter to close by their own weight at the time the animal steps upon said trap-door, and a holder adapted to engage one of two sets of guideways held on said cage at opposite ends of said trap-door, substantially as shown and described.

3. A hog-trap, comprising a cage having means for closing its ends, and a series of guides upon its sides disposed along its length, with a hog-holding mechanism mounted on a movable frame and adapted to engage any one of said guides and be held thereby.

JOHN PINCKNEY TARR.

Witnesses:
   D. N. TARR,
   STERLING P. LEMMON.